United States Patent
König et al.

Patent Number: 5,672,229
Date of Patent: Sep. 30, 1997

[54] SOLVENT-FREE TWO-COMPONENT POLYURETHANE REACTIVE ADHESIVES AND THEIR USE FOR PRODUCING SANDWICH-TYPE INTERIOR PANELLING FOR VEHICLES

[75] Inventors: Eberhard König, Leverkusen; Uwe Fritz Gronemeier, Kürten; Dirk Wegener, Monheim, all of Germany

[73] Assignee: Bayer Aktiengesellschaft, Leverkusen, Germany

[21] Appl. No.: 553,940

[22] Filed: Nov. 6, 1995

Related U.S. Application Data

[62] Division of Ser. No. 345,882, Nov. 28, 1994.

[30] Foreign Application Priority Data

Nov. 29, 1993 [DE] Germany ............ 43 40 561.4

[51] Int. Cl.⁶ ............................................. C09J 4/00
[52] U.S. Cl. ............................................. 156/331.4; 528/67
[58] Field of Search ............................ 156/331.4; 528/67

[56] References Cited

U.S. PATENT DOCUMENTS

| | | | |
|---|---|---|---|
| 3,248,370 | 4/1966 | Reischl et al. | 528/67 |
| 4,731,410 | 3/1988 | Bueltjer et al. | 528/67 |
| 4,756,785 | 7/1988 | König et al. | 156/307.3 |
| 5,166,303 | 11/1992 | Markusch et al. | 528/76 |

FOREIGN PATENT DOCUMENTS 5-148371  6/1993  Japan ............ 156/331.4

*Primary Examiner*—John J. Gallagher
*Attorney, Agent, or Firm*—Joseph C. Gil; Richard E. L. Henderson

[57] ABSTRACT

This invention relates to solvent-free two-component polyurethane reactive adhesives comprising (A) a polyisocyanate component based on diphenylmethane diisocyanates, (B) a water-containing polyol component having a maximum of three OH groups, a water content of 0.25 to 2.0 wt. %, and an OH value of 300 to 600, and optionally (C) auxiliary substances and additives, wherein component (A) and component (B) are present in proportionate amounts such that the isocyanate index is 120 to 250. These adhesives are used for producing sandwich-type interior panelling for vehicles.

1 Claim, No Drawings

SOLVENT-FREE TWO-COMPONENT POLYURETHANE REACTIVE ADHESIVES AND THEIR USE FOR PRODUCING SANDWICH-TYPE INTERIOR PANELLING FOR VEHICLES

This application is a division, of application Ser. No. 08/345,882 filed Nov. 28, 1994.

BACKGROUND OF THE INVENTION

The invention relates to solvent-free two-component adhesives for which spray-applied adhesive film can be processed for semi hours. The adhesive are preferably used for sandwich-type structured automobile internal panelling, such as car roof linings, where the adhesives, on the one hand, serve to bond together the flat materials (such as foam, glass fibre mats, and decorative materials) and, on the other hand, are intended to increase the rigidity of the sandwich construction.

Adhesives are already used for the applications mentioned. For example, the sandwiches mentioned above can be bonded together using commercially available thermoplastic films made of polyethylene, polypropylene, or polyamide under the influence of heat and pressure. However, these bonds retain their natural thermoplasticity and thus do not withstand high thermal stresses without becoming detached, for example, following storage for 48 hours at 110° C. In addition, this type of adhesive, which is a flexible thermoplastic material, does not contribute to increasing the rigidity of the sandwich.

The polyurethane hot melt adhesives described in German Offenlegungsschrift 3,543,120 also do not stiffen the sandwich due to their natural properties.

Another process that is used in practice makes use of prepolymers which possess NCO groups and which contain a proportion of solvent. These materials cure in the presence of atmospheric moisture. However, aside from the disadvantages associated with the solvent contained therein, the processing time for this type of sandwich structure, which is provided with adhesive to give molded pads, is restricted to only 20 minutes. Flexible production, where the sandwiches are produced in large numbers and then pressed in another place, is thus not possible.

Finally, two-component reactive adhesives are known and can be made, for example, from a low molecular polyisocyanate and a low molecular polyol, such as are described, inter alia, in Polyurethan-Handbuch, Carl Hanser Verlag, Munich, Vienna, 1993, at page 643 et seq. For instance, a sufficiently branched, short-chain polyol is combined with a small excess of polyisocyanate to provide a defined, setting, rigid adhesive. A prototype of this type is described, for instance, in Example 2 below. The adhesion and bending rigidity of this type of adhesive corresponds to the usual requirements. The disadvantage, however, is a short processing time which is a maximum of 40 minutes.

In practice, an adhesive is required that can be processed by both the so-called cold-forming and the so-called thermoforming pressing process in a working shift of about 8 hours in duration. The two process variants are explained in Examples 1 and 3 below. The polyurethane compositions described in U.S. Pat. 5,166,303 do not fulfill these requirements.

The object of the invention was, therefore, to develop an adhesive which, in addition to satisfying the requirements of economy, good adhesion, and an increase in bending rigidity, satisfies a flexible processability of between one and 10 hours. Surprisingly, this object is achieved with the adhesives according to the invention.

SUMMARY OF THE INVENTION

The invention provides solvent-free two-component polyurethane reactive adhesives comprising (A) a polyisocyanate component based on diphenylmethane diisocyanates, (B) a water-containing polyol component having a maximum of three OH groups, a water content of 0.25 to 2.0 wt %, and an OH value (that is a hydroxyl number) of 300 to 600 (preferably 350 to 550), and optionally (C) auxiliary substances and additives, wherein component (A) and component (B) are present in proportionate amounts such that the isocyanate index is 120 to 250.

In the preferred embodiments of the invention, the water-content of component (B) is 0.5 to 1.1 wt. % and the isocyanate index is 140 to 170.

The invention is also directed to the use of the solvent-free two-component polyurethane reactive adhesives for producing sandwich-type interior panelling for vehicles, in particular interior panelling for automobiles.

DETAILED DESCRIPTION OF THE INVENTION

Essential to the invention are the sizable water-content and the high NCO index. Both characteristics are unusual for polyurethane reactive adhesives. However, without these characteristics, the adhesives do not fulfil their intended object. For example, the processing time for compositions not having: the specified characteristics is only about 40 minutes (as illustrated in comparison example 2 below) instead of up to 15 hours, as determined in an approximation to a production trial.

The adhesives according to the invention consist of 60 to 70 wt. %, with respect to the mixture, of (A) a polyisocyanate component based on diphenylmethane diisocyanates (i.e., an "MDI" component) and 30 to 40 wt. %, with respect to the mixture, of (B) a polyol component The two components (A) and (B) are mixed by means of the two-component high-pressure technology developed for polyurethanes and sprayed in a thin layer (weight per unit area ca. 50 to 100 g/m$^2$) onto the substrates to be bonded. The adhesive is applied at room temperature. The flat substrates coated with adhesive, for example, backing fabric, glass matting, or cut up rovings on a substrate, foam sheets, and decorative material, are laid on top of each other and, in general, pressed together to produce a sandwich. This sandwich can be further processed by the following processes to give a molded item, such as a car roof lining:

In the so-called cold forming process, the cold sandwich is placed in a heated mold (80 to 130° C.) and the mold is closed. The sandwich is thus cold-pressed because the heat in the two halves of the mold can only have an effect in a closed mold.

In the so-called thermoforming process, the sandwich is preheated to 130° to 200° C. in a heat station and then placed in a cold mold.

Both processes have been technically fully developed and operate with a considerable number of items. Until now, only the prior art adhesives mentioned above, with the disadvantages described, have been available.

The MDI-based component (component (A)) used can be any mixture (preferably technical grades that are liquid at room temperature) of 4,4'-diisocyanatodiphenylmethane, along with its isomers and their higher homologs, which have more than two isocyanate groups. These (industrial) MDI mixtures preferably have a viscosity of 20 to 500 mPa.s at 25° C. An industrial MDI mixture with an NCO content of ca. 31.4 wt. % and a viscosity of 200 mPa.s at 25° C. is preferably used.

The polyol component (component (B)) is preferably a mixture of the following components:

(B1) 60 to 90 wt. % (with respect to (B)) of di- and trifunctional polyethers having an OH value of 28 to 600, which can be obtained by reacting ethylene oxide and/or propylene oxide with glycols (e.g., ethylene or 1,2-propylene glycol) and with 3-hydric alcohols (e.g., trimethylolpropane), (B2) 0 to 15 wt. % (with respect to (B)) of polyesters that possess OH groups and have an OH value of 200 to 300, (B3) 5 to 20 wt. % (with respect to (B)) of glycols having a molecular weight of 62 to 200, (B4) 1 to 2 wt. % (with respect to (B)) of water, and (B5) 0.5 to 3 wt. % (with respect to (B)) of activators (e.g., potassium acetate, tin compounds, and/or tertiary amines)

The quantities of components (B1) to (B5) total 100%.

Component (B1) preferably contains 30 to 40 wt. % (with respect to (B)) of difunctional propylene oxide polyethers with an OH value range of 112 to 300, 15 to 30 wt. % (with respect to (B)) of trifunctional propylene/ethylene oxide polyethers with an OH value range of 300 to 600, and 15 to 20 wt. % (with respect to (B)) of trifunctional propylene/ethylene oxide polyethers with an OH value range of 28 to 56.

Component (B2) preferably contains 0 to 15 wt. % (with respect to (B)) of difunctional polyesters which are liquid at room temperature, such as can be obtained by condensation of glycols (e.g., diethylene glycol, 1,2-propylene glycol, or neopentyl glycol) with a dicarboxylic acid (preferably adipic acid and/or phthalic anhydride).

Component (B3) preferably contains 5 to 20 wt. % (with respect to (B)) of glycols, such as ethylene, diethylene, 1,2- or 1,3-propylene glycol, and 1,4-butanediol.

The optionally used auxiliary substances and additives used according to the invention are of known conventional types, for example, catalysts, mold release agents, and stabilizers.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

Example 1 (according to the invention)

Formulation

| | |
|---|---|
| 38.8 parts by wt. | a propylene oxide polyehter started on proplene glycol, OH value 270 |
| 19.4 parts by wt. | a propylene oxide polyether started on trimethylolpropane, OH value 550 |
| 19.4 parts by wt. | a propylene oxide/ethylene oxide (87 wt % to 13 wt %) polyether started on trimethylolpropane, OH value 35 |
| 12.2 parts by wt. | of phthalic acid/diethylene glycol/ethylene glycol polyester, OH value 290 |
| 10.2 parts by wt. | ethylene glycol, OH value 1806 |
| 100 parts by wt. | a polyol mixture, OH value 438, viscosity at 20° C. ca. 500 mPa · s |

The polyol component is made ready-to-spray by using the following formulation:

| | |
|---|---|
| 100 parts by wt. | above polyol mixture, OH value 438, viscosity at 20° C. ca. 500 mPa · s |
| 1.0 part by wt. | water |
| 1.0 part by wt. | a mixture of 25 wt. % potassium acetate and 75 wt. % of diethylene glycol |
| 0.1 parts by wt. | dibutyltin dilaurate |
| 102.1 parts by wt. | polyol component, OH value ca 495 |

The adhesive mixture consists of the following:

| | |
|---|---|
| 100.0 parts by wt. | the above polyol component, OH value ca 495 |
| 175.0 parts by wt. | a conventional industrial crude MDI, NCO content ca 31.4%, viscosity at 25° C. ca 200 mPa · s |
| 275.0 parts by wt. | adhesive mixture, isocyanate index (including water) ca. 148 |

The amounts of activator mentioned above correspond to a processing time of ca. 2 hours. If a larger stock of pre-products coated with adhesive is to be laid down and pressed only after a period of ca. 8 hours, then the amounts of activator and the like must be halved.

Processing (variant 1)

The polyol and MDI components mentioned above are mixed by a commercially available high-pressure plunger unit (operating pressure ca. 200 bar) with an output rate for both components of ca. 400 to 800 g of mixture per minute and sprayed. The ratio of NCO to OH groups in the mixture is then, as stated above, 1.48, corresponding to an isocyanate index value of 148.

The partially automated process may be described, in principle, as follows. A mixing head is located inside a cabinet. A polyester fabric onto which is scattered sections of glass fiber is introduced into the cabinet. The glass fibers and partly also the polyester fabric are sprayed with ca. 50 to 100 g of adhesive per m$^2$. In series with the spray cabinet, foam sheets are laid onto the glass fibers wetted with adhesive. In the next station, decorative fabric, the back of which has been provided with glass fibers and adhesive, is introduced from above and covers the foam sheets.

In the next station, foam sheets, each coated on the top and the bottom with two materials including the adhesive, arm cut into sections. This loosely pressed together sandwich is collected and stacked for the final working stage.

At this point in the processing procedure, the adhesive the invention displays its useful ability of being processable for several hours. The processor can, therefore, flexibly organize production.

A stack of sandwich units is rolled up in front of the heated mold (80° to 130° C). The first sandwich is, for example, one hour old. The sandwich units are pressed in a ca. one-minute cycle and removed from the hot mold. At this point, the adhesive must set and the sandwich gain rigidity so that the still warm, freshly pressed part (e.g., a car roof lining) can be removed from the mold without suffering damage. This also is a critical point in the working method which is described. If the adhesive has still not set at this point or is too soft, then the molded item cannot be removed without a delay or some damage.

Example 2 (comparison)

The adhesive mixture used for this comparison example contains no added water. The polyol mixture is composed of a considerable amount of tetrafunctional polyethers, in contrast to the polyol mixtures according to the invention. The isocyanate index of 120 used for this example corresponds to an NCO excess, as is conventional for polyurethane adhesives with defined curing.

Formulation

| 49.0 parts by wt. | a propylene oxide/ethylene oxide (87 wt. % to 13 wt. %) polyether started on trimethylolpropane, OH value 35 (cf. Example 1) |
| 26.0 parts by wt. | a propylene oxide polyether started on trimethylolpropane, OH value 550 (cf. Example 1) |
| 100.0 parts by wt. | polyol mixture, OH value 277, viscosity at 20° C. ca. 2,000 mPa · s |

The polyol component is made ready-to-spray by using the following formulation:

| 100.0 parts by wt. | the above polyol mixture, OH value 277 |
| 0.5 parts by wt. | a mixture of 25 wt. % potassium acetate and 75 wt. % diethylene glycol |
| 0.005 parts by wt. | dibutyltin dilaurate |

The adhesive mixture consists of the following:

| 100.0 parts by wt. | the above polyol component, OH value ca. 277 |
| 80.0 parts by wt. | industrial grade crude MDI (NCO content ca. 31.4%) in accordance with Example 1 |
| 180.0 parts by wt. | adhesive mixture, isocyanate index 120 |

Processing (variant 1)

The adhesive components above are sprayed by means of the same high-pressure plunger unit already described in Example 1. In contrast to the adhesive according to the invention in accordance with Example 1, a larger amount of ca. 130 g per m$^2$ must be sprayed on in order to achieve an adequate degree of wetting. Also in contrast to the example according to the invention, this adhesive film does not foam up. The adhesive can be processed well for ca. 40 minutes, but after this time the material has set and can no longer be thermally regenerated. Working from a stock, as described in Examples 1 and 3, is thus not possible.

Example 3 (according to the invention)

In contrast to Example 1, the proportion of trifunctional polyethers with a high OH value is enlarged and a further variant of the finishing process for molded parts was used.

Formulation

| 35.3 parts by wt. | a propylene oxide polyehter started on propylene glycol, OH value 270 (cf. Example 1) |
| 17.7 parts by wt. | a propylene oxide/ethylene oxide 87 wt. % to 13 wt. %) polyether started on trimethylolpropane, OH value 35 (cf. Example 1) |
| 11.0 parts by wt. | a phthalic acid/diethylene glycol/ethylene glycol polyester, OH value 290 (cf. Example 1) |
| 9.3 parts by wt. | ethylene glycol, OH value 1806 |
| 9.0 parts by wt. | an ethylene oxide polyether started on trimethylolpropane, OH value 550 |
| 100.0 parts by wt. | polyol mixture, OH value 488, |

The polyol component is made ready-to-spray by using the following formulation:

| 100.0 parts by wt. | the above polyol mixture, OH value 448 |
| 1.0 part by wt. | a mixture of 25 wt. % potassium acetate and 75 wt. % of diethylene glycol |
| 0.1 part by wt. | dibutyltin dilaurate |
| 1.0 part by wt. | water |
| 102.1 parts by wt. | polyol component, OH value ca. 500 |

The adhesive mixture consists of the following:

| 100.0 parts by wt. | the above polycol component, OH value ca. 500 |
| 180.0 parts by wt. | industrial grade crude MDI (NCO: 31.4%), in accordance with Example 1 |
| 280.0 parts by wt. | adhesive mixture, isocyanate, index 150 (including water) |

Processing (variant 2)

This adhesive can be applied in the way described in Example 1. The thus bonded molded parts can easily be removed from the hot mold. The molded parts have a high rigidity. By reducing the activating ingredients, the processability of parts sprayed with this adhesive can be extended to ca. 10 hours.

A second embodiment can be illustrated as follows. A backing fabric, a glass matting, and a decorative fabric are sprayed on one side with this adhesive using the method described in Example 1. The sandwiches are produced by laying the said flat parts onto each other in the following sequence: backing fabric, glass matting, foam sheets, glass matting, and decorative fabric. This sandwich is stored overnight (that is for at least 12 hours). The sprayed adhesive film according to the invention then feels dry. The stored sandwiches are pushed one after the other into a large infrared heater, such as is used in the production of car roof linings. If the foam sheeting material is a polystyrene copolymer, the sandwich is heated to 130° C. in about 2 minutes; if the foam core is polyurethane, the sandwich is heated to 190° C. in about 3 minutes. The hot sandwich is then placed in a cold mold and is pressed for about 30 seconds to produce a car roof lining.

It was surprising that the adhesive according to the invention could be thermally activated after ca. 12 hours of storage and, despite feeling dry (i.e., set), it produced solid, rigid bonds. This behavior could not be produced either by the comparison adhesive described in Example 2 or by the single-component adhesives mentioned in the prior art.

What is claimed is:

1. A method for producing a sandwich structure suitable for interior panelling for vehicles comprising (1) coating two or more flat substrates with a solvent-free two-component polyurethane reactive adhesive consisting essentially of
      (A) a polyisocyanate component based on diphenylmethane diisocyanates,
      (B) a polyol component having an overall OH value of 300 to 600, said polyol component being a mixture of
         (B1) 60 to 90 wt. % of difunctional and trifunctional polyethers having an OH value of 28 to 600 obtained by reacting ethylene oxide and/or propylene oxide with glycols and with trihydric alcohols,
         (B2) 0 to 15 wt. % of polyesters possessing OH groups and having an OH value of 200 to 300,
         (B3) 5 to 20 wt. % of glycols having a molecular weight of 62 to 200,
         (B4) 1 to 2 wt. % of water, and
         (B5) 0.5 to 3 wt. % of activators, the quantities of components (B1) to (B5) being relative to the total amount of polyol component and totalling 100 wt. %, and optionally
      (C) additives, wherein component (A) and component (B) are present in proportionate amounts such that the isocyanate index is 120 to 250; and (2) pressing together the coated flat substrates to produce the sandwich structure.

* * * * *